(12) United States Patent
Fillatreau et al.

(10) Patent No.: US 7,248,983 B2
(45) Date of Patent: Jul. 24, 2007

(54) ELECTRONIC COMPASS AND METHOD OF CONTROLLING AN ELECTRONIC COMPASS USING INDEPENDENT CALIBRATION AND COMPASS HEADING MODULES

(75) Inventors: Philippe Fillatreau, Toulouse (FR); Francois-Xavier Bernard, Corronsac (FR)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

(21) Appl. No.: 11/101,284

(22) Filed: Apr. 7, 2005

(65) Prior Publication Data

US 2005/0228603 A1   Oct. 13, 2005

Related U.S. Application Data

(60) Provisional application No. 60/560,205, filed on Apr. 7, 2004.

(51) Int. Cl.
*G01C 17/38* (2006.01)
(52) U.S. Cl. .......................... 702/92; 364/457; 33/316; 33/319; 33/355; 33/356; 33/357; 33/352; 701/1; 701/200; 701/224; 701/205; 701/213; 701/214; 73/1.75; 73/1.76; 324/260

(58) Field of Classification Search ................ 702/92
See application file for complete search history.

(56) References Cited

U.S. PATENT DOCUMENTS

| 4,611,293 | A | | 9/1986 | Hatch et al. |
| 5,046,031 | A | | 9/1991 | Wanous |
| 5,737,226 | A | * | 4/1998 | Olson et al. ................. 701/224 |
| 6,014,610 | A | * | 1/2000 | Judge et al. ................... 702/92 |

* cited by examiner

*Primary Examiner*—John Barlow
*Assistant Examiner*—Sujoy Kundu

(57) ABSTRACT

A method for controlling an electronic compass includes receiving raw magnetic field data into a calibration module and determining a calibration output based upon the raw magnetic field data. The raw magnetic field data is also received into a compass heading module for determining compass heading outputs based upon the raw magnetic field data. The calibration module filters the raw magnetic field data and validates the calibration outputs independently from output data filtering and results validation in the compass heading module.

15 Claims, 2 Drawing Sheets

ELECTRONIC COMPASS AND METHOD OF CONTROLLING AN ELECTRONIC COMPASS USING INDEPENDENT CALIBRATION AND COMPASS HEADING MODULES

The application claims priority to U.S. Provisional Application No. 60/560,205, filed on Apr. 7, 2004.

BACKGROUND OF THE INVENTION

This invention relates to a compass and, more particularly, to an electronic compass assembly and methods for controlling an electronic compass assembly.

Electronic compass assemblies are often used in vehicles to indicate to a driver or passenger of the vehicle a direction that the vehicle is facing or traveling. A typical electronic compass assembly includes magnetic sensors that detect a magnetic field of the Earth. A microprocessor typically then determines the direction of the vehicle from the detected magnetic field and displays the direction as one of North, South, East, West, Northeast, Northwest, Southeast, and Southwest.

The magnetic conditions of the vehicle and surrounding environment of the vehicle typically change over time. As a result, the magnetic sensors are periodically calibrated to correct the magnetic field data for these magnetic changes. Calibration typically includes collecting magnetic field data from the magnetic sensors through a 360° turn of the vehicle (or a predetermined percentage of a 360° turn). The collected magnetic field data is generally ellipse-shaped. The microprocessor utilizes a statistical fitting procedure to produce a reference correction factor (e.g., a calibration ellipse) from the collected magnetic field data. The reference correction factor is then used to correct magnetic field data points before the microprocessor determines the vehicle direction.

Typical electronic compass microprocessors receive raw magnetic field data from the magnetic sensors. The microprocessor typically filters the raw magnetic field data before calibration to improve the reliability and accuracy of the calibration by removing or smoothing noisy data points. The filtered magnetic field data is then used in the calibration computation. The filtered data is subsequently used in the compass heading computation. Although the filtering is intended to improve the reliability and accuracy of the calibration computations, it may hinder the reliability and accuracy of the compass heading computation because what is determined to be noisy data for the calibration computation is not necessarily noisy data for the compass heading computation, for example. Likewise, tuning the filtering to improve the reliability and accuracy of the compass heading computation may hinder the reliability and accuracy of the calibration computation.

Accordingly, there is a need for an electronic compass assembly and method that provides for independent control over the calibration computation and the compass heading computation. This invention addresses those needs and provides enhanced capabilities while avoiding the shortcomings and drawbacks of the prior art.

SUMMARY OF THE INVENTION

An example method for controlling an electronic compass includes receiving raw magnetic field data into a calibration module and determining a calibration output based upon the raw magnetic field data. The raw magnetic field data is also received into a compass heading module for determining compass heading outputs based upon the raw magnetic field data. The calibration module filters the raw magnetic field data and validates the calibration output independently from filtering and validation in the compass heading module.

An example electronic compass assembly includes a calibration module operable to receive raw magnetic field data and determine a calibration output based upon the raw magnetic field data and a compass heading module operable to receive the raw magnetic field data and determine compass heading outputs based upon the raw magnetic field data.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
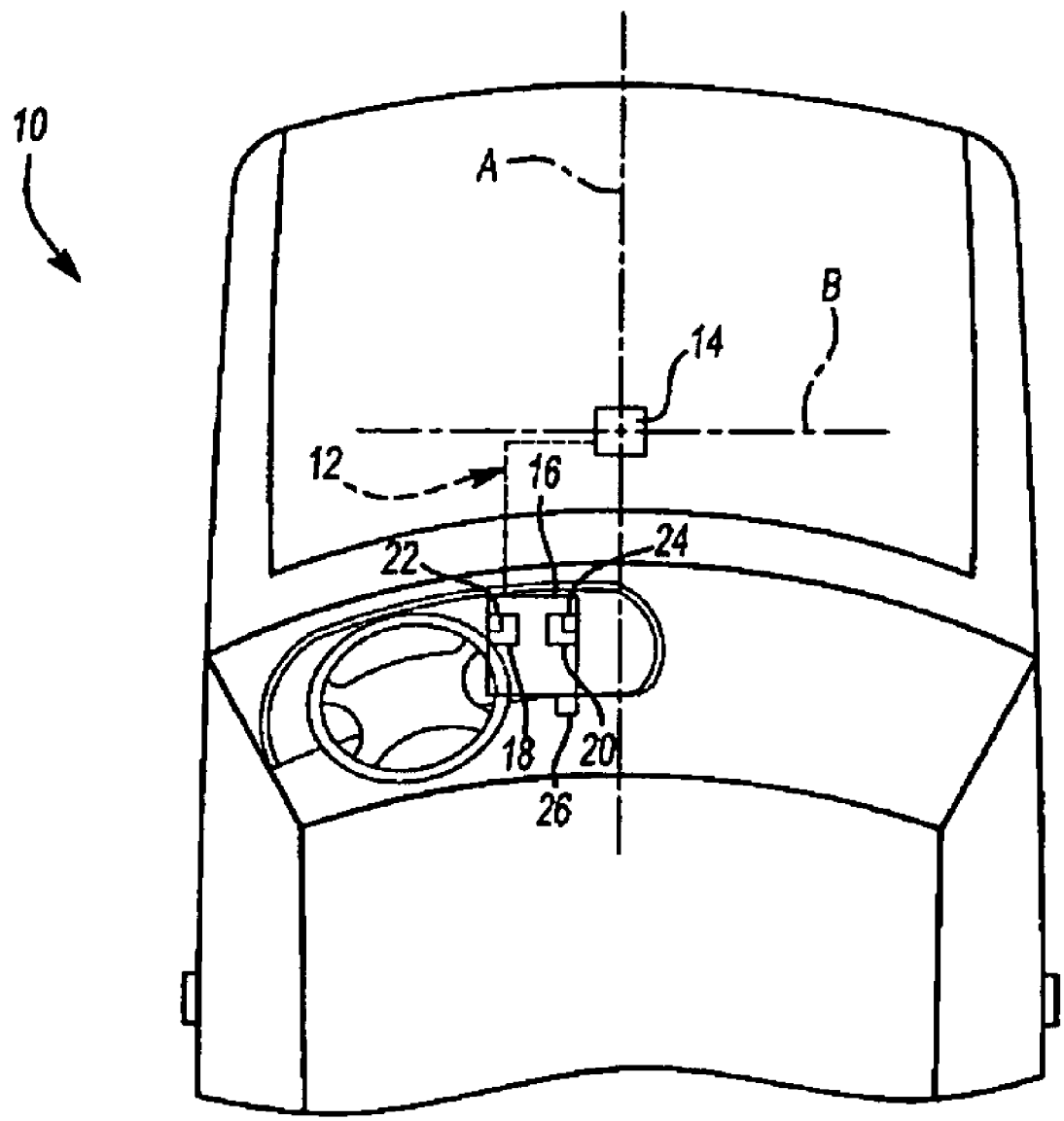
FIG. 1 is a schematic view of selected portions of an example vehicle having an electronic compass assembly.

FIG. 1 is a schematic view of an example vehicle 10 having an electronic compass assembly 12 for determining a direction the vehicle 10 is facing or traveling. In the example shown, the electronic compass assembly 12 includes magnetic sensors 14 that detect a magnetic field along a first longitudinal axis A and a second, transverse axis B. The magnetic sensors 14 communicate output signals that correspond to raw magnetic field data to a processor module 16 in a known manner. In one example, the raw magnetic field data directly corresponds to the output signals such that the output signals are converted to digital raw magnetic field data before magnetic interference correction, data smoothing, or data filtering.

The processor module 16 includes a calibration module 18 and a compass heading module 20. The calibration module 18 receives the raw magnetic field data into a first filter module 22 that selectively filters the raw magnetic field data for determination of a calibration output. The compass heading module 20 receives the raw magnetic field data into a second filter module 24 that selectively filters the raw magnetic field data independently from the filtering in the calibration module 18 for determination of a compass heading output. The compass heading outputs correspond to the vehicle direction, which is displayed on a compass display portion 26 to an occupant of the vehicle 10, for example. Filtering the raw magnetic field data in the calibration module 18 independently from filtering the raw magnetic field data in the compass heading module 16 provides the benefit of allowing the filtering in each module to be tuned to increase the reliability and accuracy of the calibration and compass heading computations.

Figure 2:
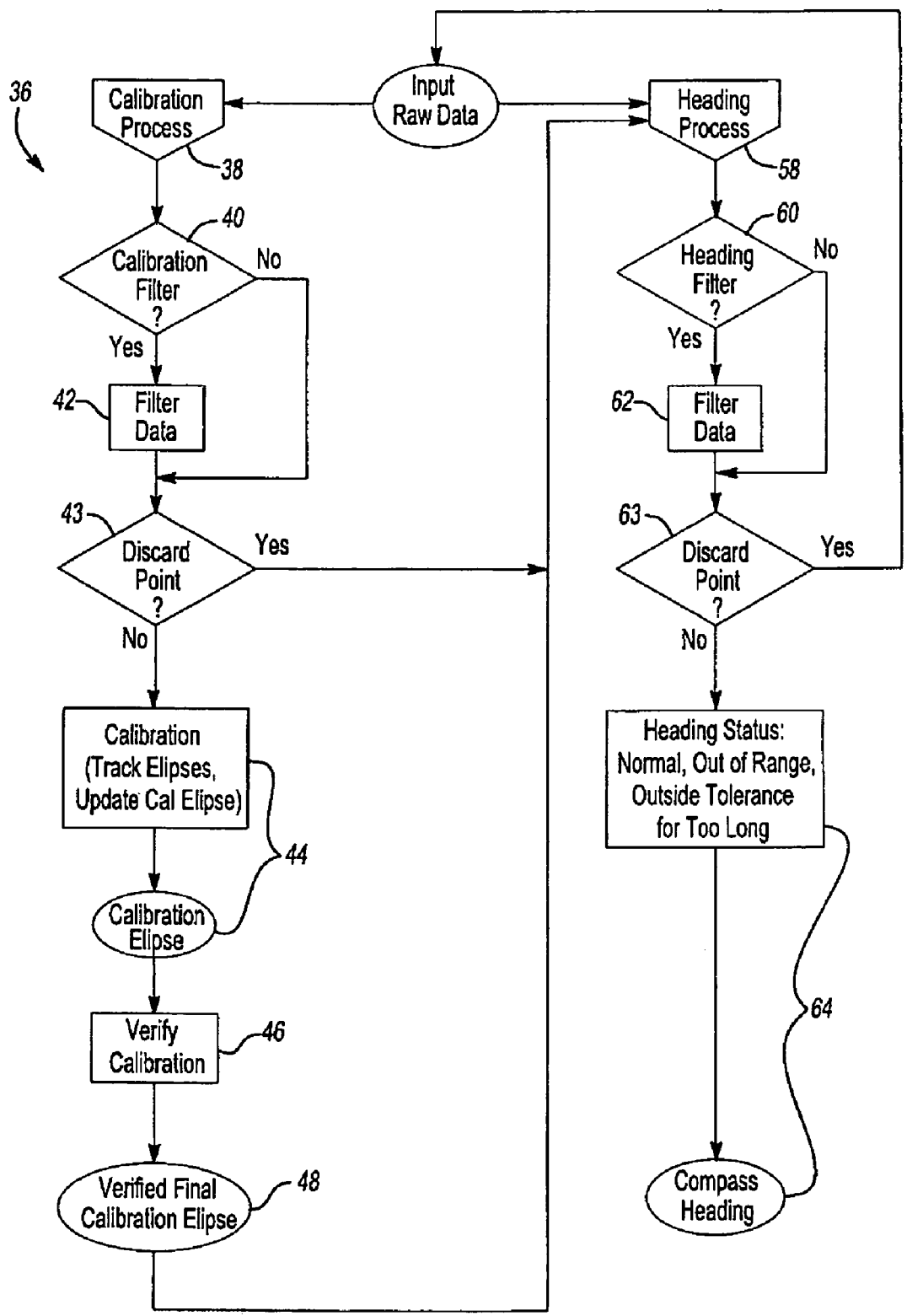
FIG. 2 schematically illustrates an example flow chart that a processor module utilizes to control an electronic compass assembly.

FIG. 2 schematically illustrates an example flow chart 36 that the processor module 16 utilizes to control the electronic compass assembly 12. At 38, the calibration module 18 receives raw magnetic field data and at 40 either directs the raw magnetic field data to be filtered at 42 or directs the raw magnetic field data to a calibration procedure at 44. The step at 40 is essentially a switch having a predetermined setting to either direct the raw magnetic field data to 42 or 44.

If the step at 40 directs the raw magnetic field data to 42, the processor module 16 filters the raw magnetic field data. In one example, the calibration module 18 determines whether the raw magnetic field data is within a first noise threshold. Raw magnetic field data points that are within the first noise threshold are included in a first filtered data set and directed to the step at 44. In one example, the first noise threshold is based upon a predetermined noise level. In another example, raw magnetic field data that is not within the predetermined noise level is discarded at 43. In one example, raw magnetic field data that is not within the predetermined noise level contributes to inaccuracy in computing the calibration output if it is not filtered before the computation, for example.

In another example, at 42 the first filter module 22 smoothes data points of the raw magnetic field data that are not within the first noise threshold according to a first smoothing parameter. The smoothed data points are then included in the first filtered data.

In another example, the first filter module 22 compares one raw magnetic field data point to one or more previous magnetic field data points to determine whether to reject the one raw magnetic field data point. Given this description, those of ordinary skill in the art will be able to recognize other types of filtering in addition to rejecting or smoothing raw magnetic field data points that meet their particular needs.

In the illustrated example, the calibration module 18 tracks rotation of the vehicle 10 in a known manner based upon the first filtered data. When the calibration module 18 determines that the vehicle 10 has rotated a predetermined amount, the calibration module 18 performs a statistical fitting based upon the first filtered data. The statistical fitting of the first filtered data results in a calibration output, such as a calibration ellipse for example. As is known, electronic compass assemblies are periodically calibrated to account for magnetic interference, drift in the magnetic sensors over time, and other factors that affect the accuracy of the calculated vehicle direction. The first filtered data is utilized at 44 towards computation of the calibration output when magnetic field data through the predetermined amount of rotation has been collected.

In the illustrated example, the calibration module 18 verifies the calibration output at 46. In one example, the computed calibration output is compared to calibration output criteria to determine whether the computed calibration output is valid or not. The calibration module 18 rejects the computed calibration output if it fails to meet the calibration output criteria and accepts the computed calibration output at 48 if it meets the criteria. In the latter case, the calibration module 18 stores an accepted calibration output for use by the compass heading module 20, as will be described below.

At 58 the compass heading module 20 receives the raw magnetic field data and at 60 either directs the raw magnetic field data to be filtered at 62 or directs the raw magnetic field data to a compass heading procedure at 64. The step at 60 is essentially a switch having a predetermined setting to either direct the raw magnetic field data to 62 or 64.

If the step at 60 directs the raw magnetic field data to 62, the compass heading module 20 filters the raw magnetic field data. In one example, the compass heading module 20 determines whether the raw magnetic field data is within a second noise threshold. If the raw magnetic field data is within the second noise threshold, it is included in a second filtered data set and directed to the step at 62. In one example, the second noise threshold is based upon a predetermined noise level. In another example, raw magnetic field data that is not within the predetermined noise level is discarded at 63 and not included in the second filtered data set. In one example, raw magnetic field data that is not within the second noise threshold contributes to inaccuracy in computing the compass heading output, for example.

In another example, the second noise threshold is different than the first noise threshold used by the calibration module 18 such that the compass heading module 20 selects different data points at 62 for inclusion in the second filtered data than the calibration module 18 selects at 42 for inclusion in the first filtered data. This feature provides flexibility to tailor the filtering at 64 to the compass heading computation, as will be described below.

In another example, at 62 the second filter module 24 smoothes data points of the raw magnetic field data according to a second smoothing parameter and the smoothed raw magnetic field data is then included in the second filtered data. Filtering the raw magnetic field data at 44 in the calibration module 18 independently from the filtering at 64 in the compass heading module provides the benefit of possibly using different smoothing parameters in each filtering step. This allows the smoothing to be tailored in each module to provide suitable data for accurate and reliable outputs in each module.

In another example the filtering at 64 in the compass heading module 20 is different than the filtering at 44 in the calibration module 18. In one example, the calibration module 18 smoothes a raw magnetic field data point for inclusion in the first filtered data and for use in determination of the calibration output. The compass heading module 20 determines that the same magnetic field raw data point is not within the second noise threshold and rejects the raw data point for inclusion in the second filtered data in the filtering step at 62. The raw magnetic field data point in this example is not used to determine a compass heading output.

In another example, the calibration module 18 smoothes a raw data point A, for example, according to the first smoothing parameter to produce smoothed data point A' for inclusion in the first filtered data. The compass heading module 20 smoothes the raw data point according to the second smoothing parameter to produce smoothed data point A" for inclusion in the second filtered data. In this example, the smoothed data point A" is suitable for computing an accurate and reliable compass heading output. Had the compass heading module used the smoothed data point A', the compass heading output would be less accurate and less reliable. Filtering the raw magnetic field data in the calibration module 18 independently from filtering the raw magnetic field data in the compass heading module 20 provides the benefit of tailoring the filtering in each module to produce suitable data points for computing accurate and reliable outputs in each module.

In another example, the calibration module 18 determines that a raw data point is within the first noise threshold and includes it in the first filtered data. The compass heading module 20 determines that the same raw data point is not within the second noise threshold and rejects the raw data point for inclusion in the second filtered data in the filtering step at 64. The raw data point in this example is not used to determine a compass heading output.

In another example, a raw data point is within both the first noise threshold and the second noise threshold. The raw data point is then included in the first filtered data and the second filtered data as an overlapping data point (i.e. it is used to determine the calibration output and the compass heading output).

In the illustrated example, the compass heading module 20 determines a compass heading output (e.g. an angle for determining the vehicle direction) in a known manner at 64 based upon the first filtered data and the stored calibration output determined by the calibration module 18.

In the illustrated example, the compass heading module verifies the computed compass heading output by comparing it to compass heading output criteria to determine whether the computed compass heading output is valid or not, such as described in U.S. patent application Ser. No. 11/101,283, for example. The compass heading module 20 rejects the computed compass heading output if it fails to meet the compass heading output criteria and accepts the computed compass heading output if it meets the criterion.

In the disclosed examples, utilizing the calibration module 18 separately and independently from the compass heading module allows the functions performed by each module to be easily controlled. Filtering the raw magnetic field data in the calibration module 18 independently from filtering the raw magnetic field data in the compass heading module 20 provides the benefit of being able to reject a compass heading output that is based upon a selected data point while accepting a calibration output that is based on the same selected data point. Moreover, the output of the calibration module 18 is validated independently from the output of the compass heading module such that acceptance or rejection of the output from one has no affect on the acceptance or rejection of the output of the other.

Although a preferred embodiment of this invention has been disclosed, a worker of ordinary skill in this art would recognize that certain modifications would come within the scope of this invention. For that reason, the following claims should be studied to determine the true scope and content of this invention.

We claim:

1. A method of controlling an electronic compass comprising:
   selectively filtering raw magnetic field data within a calibration module to produce first filtered data;
   selectively filtering the raw magnetic field data within a compass heading module to produce second filtered data such that the first filtered data and the second filtered data include at least one overlapping magnetic field data point and at least one different magnetic field data point;
   determining a calibration output based upon the first filtered data;
   determining a compass heading output based upon the second filtered data; and
   displaying a vehicle direction based upon the compass heading output.

2. The method as recited in claim 1, including comparing the raw magnetic field data to a first noise threshold to produce the first filtered data and comparing the raw magnetic field data to a different, second noise threshold to produce the second filtered data.

3. The method as recited in claim 2, including accepting a data point of the raw magnetic field data for inclusion in the first filtered data or the second filtered data and rejecting the data point for inclusion in the other of the first filtered data or second filtered data.

4. The method as recited in claim 1, including smoothing a data point of the raw magnetic field data according to a first smoothing parameter for inclusion in the first filtered data or the second filtered data and smoothing the data point according to a different, second smoothing parameter for inclusion in the other of the first filtered data or second filtered data.

5. The method as recited in claim 1, including rejecting one of the calibration output or the compass heading output and accepting the other of the calibration output or the compass heading output.

6. The method as recited in claim 1, including selectively filtering the raw magnetic field data to produce first filtered data before receiving the raw magnetic field data into the second filter module.

7. An electronic compass assembly comprising:
   a calibration module operable to receive raw magnetic field, data and determine a calibration output based upon raw magnetic field data, wherein the calibration module includes a first filter module that is operable to receive the raw magnetic field data, produce first Filtered data based upon the raw magnetic field data, and determine a calibration output based upon the first filtered data;
   a compass heading module operable to receive the raw magnetic field data and determine compass heading outputs based upon the raw magnetic field data, wherein the compass heading module includes a second filter module that is operable to receive the raw magnetic field data, produce second filtered data based upon the raw magnetic field data, and determine the compass heading outputs based upon the second filtered data.

8. The assembly as recited in claim 7, wherein the first filtered data and the second filtered data each include at least one overlapping magnetic field data point and at least one different magnetic field data point.

9. The assembly as recited in claim 7, wherein the first filter module is operable to produce the first filtered data based upon a first noise threshold and the second filter module is operable to produce the second filtered data based upon a different, second noise threshold.

10. The assembly as recited in claim 9, wherein one of the first filter module or the second filter module rejects a portion of the raw magnetic field data for inclusion, respectively, in the first filtered data or the second filtered data, and the other of the first filter module or the second filter module accepts the portion of the raw magnetic field data for inclusion, respectively, in the first filtered data or the second filtered data.

11. The assembly as recited in claim 7, wherein at least one of the first filter module or the second filter module is operable to smooth a portion of the raw magnetic field data to respectively produce the first filtered data or the second filtered data.

12. The assembly as recited in claim 7, wherein the calibration module is operable to selectively reject the calibration output and the compass heading module is operable to selectively reject the compass heading output.

13. The assembly as recited in claim 7, including at least one magnetic field sensor that senses a magnetic field and produces output signals corresponding to the raw magnetic field data.

14. The assembly as recited in claim 7, including a display portion in communication with the compass heading module for displaying vehicle directions based upon the compass heading outputs.

15. The assembly as recited in claim 7, wherein the first filtered data and the second filtered data exclude at least a portion of the raw magnetic field data.

* * * * *